United States Patent [19]

Harris

[11] 4,073,470
[45] Feb. 14, 1978

[54] PRESS DISC VALVE
[75] Inventor: Edward Harris, Pittsburgh, Pa.
[73] Assignee: Koppers Company, Inc., Pittsburgh, Pa.
[21] Appl. No.: 756,594
[22] Filed: Jan. 4, 1977
[51] Int. Cl.² ............................................. F16K 25/00
[52] U.S. Cl. ..................................... 251/163; 251/161
[58] Field of Search ............... 251/162, 163, 160, 161, 251/188

[56] References Cited
U.S. PATENT DOCUMENTS

| 2,673,061 | 3/1954 | Broz | 251/163 X |
| 2,934,310 | 4/1960 | Kinney | 251/163 |
| 3,306,571 | 2/1967 | Bussi | 251/160 X |
| 3,498,583 | 3/1970 | Friedell | 251/162 |
| 3,843,090 | 10/1974 | Schneider | 251/163 X |

Primary Examiner—Harold W. Weakley
Attorney, Agent, or Firm—R. Lawrence Sahr; Oscar B. Brumback

[57] ABSTRACT

A pivotal disc shut-off valve is disclosed wherein a disc is pressed against a peripheral seat within a valve body to halt the flow of fluid material in a flow line. The disc is operated by a system of linkage arranged so as to allow the disc to be linearly moved in relation to the seat as a separate and distinct motion from pivotation of the disc. In closing the valve, a provision is made by which the disc is rocked as it contacts the seat to insure full closure. All motions of the disc are positively directed, with no reliance on the force of gravity, thus allowing the valve to be used in all positions.

9 Claims, 9 Drawing Figures

PRESS DISC VALVE

BACKGROUND OF THE INVENTION

1. Field of the Invention

This invention relates to disc-type valves used in the flow lines for fluid material to commence or halt the flow of such materials.

2. Description of the Prior Art

Disc-type valves are heretofore known have several problems. In disc-type valves, such as the known three-lever valves, the movement of the disc is such that it begins to pivot almost immediately as force is applied through the lever linkage. This pivotal motion causes the disc to slide across the surface of the valve seat in an abrasive fashion resulting in a scratched and abraded valve seat. Once the valve seat loses it original smooth finish, the ability of the valve to halt the flow of fluids is significantly reduced.

Due to the pressure differential encountered in closing the disc of a disc-type three lever valve, there exists in known valves of this type, a leakage problem caused by the force of flowing material through the valve, preventing the disc from fully seating itself against the valve seat.

All of the known butterfly valves encounter fluctuations in the rate and direction of flow of materials through them. In addition, various impurities of a physical quality different from that of the intended material, flow through the valve. The result is a tendency to cause the valve disc to flutter about its pivotal axis. Such flutter augments the fluctuation of flow and can cause the valve to partially close at an inopportune time.

In accordance with this invention, there is provided control of the motion of the valve disc such (a) that it is positively pulled away from the valve seat before it is pivoted, thus eliminating the sliding motion of the disc across the seat; (b) that it is closed through a positive means which insures full contact of the valve disc periphery against the valve seat upon closure of the valve; and (c) that it is held immobile in its open position despite the flow of fluid past the disc.

SUMMARY OF THE INVENTION

The present invention is directed primarily to an improvement in the means for operating a disc-type valve by a specific arrangement of levers and guides which operate in conjunction with each other to produce a distinct linear movement of the valve disc in relation to the valve seat, and thereafter a pivoting movement of the disc, the linear motion being separate and non-concurrent from pivotation of the valve disc. All motions of the valve disc are positively directed and controlled by mechanical means and not dependent on operation of the forces of gravity. The points of connection of the levers to the valve disc and guides are arranged to lock the valve disc in position when the valve is open, to rock the valve disc against the valve seat during closure of the valve and to lock the valve in closed position.

Rotary force is directed through an eccentric which is linked to a valve disc. A pivot is also mounted on the valve disc to extend into guides. Within the guides, a leverage system directs and controls the motion of the valve disc. At the open and the closed position of the valve, the valve disc is locked in place. As the valve is closed, a hook fixed to the valve disc engages the link, connecting the eccentric to the disc, and shifts the point of force applied to the disc causing the disc to rock into place against the valve seat.

One of the principal features of this invention is the ability of the valve to be operated in any position, independent of the force of gravity.

Another principal feature of the current invention is the provision of a means by which damage to the valve seat can be avoided by eliminating the possibility of any sliding motion of the disc periphery across the plane of the valve seat as the valve is being opened and closed.

Another principal feature of the current invention is the provision of a means by which the valve disc is held rigidly when in the open position, eliminating flutter which causes significant fluctuation in the rate of material flow through the valve and also eliminating the possibility of unintended closure of the valve.

Another principal feature of the current invention is the provision of a means by which the valve disc can be positively closed against the valve seat so as to insure no leakage of the valve in operation.

These, and other features of this invention, will be more completely disclosed and described in the following detailed description, the accompanying drawings and the appended claims.

DETAILED DESCRIPTION

Figure 1:
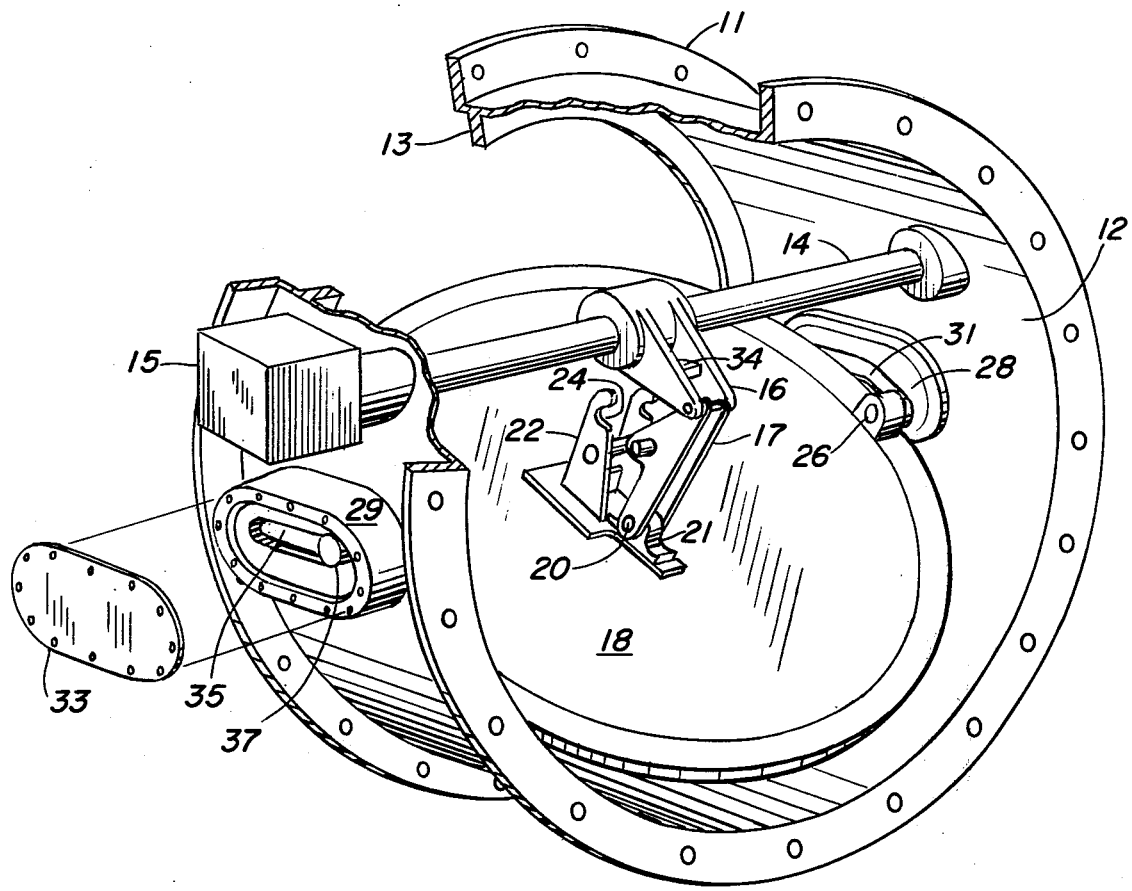
FIG. 1 is an isometric perspective view of a preferred embodiment of the valve as viewed from the left rear corner, with a section of the valve body removed to reveal the internal positioning of the elements of the valve in a partially opened/closed position.

Referring to FIG. 1 of the drawings, there is illustrated a valve body 11 that includes as an integral part thereof a valve seat 13. In accordance with the preferred embodiment, a crankshaft 14 is transversely positioned within the valve body 11 above the central axis of the valve body. The crankshaft 14 is mounted so as to allow it to be rotated about its axis by any one of many commercially available means of producing rotary motion, such as a gear reduced motor, generally designated by the numeral 15. The means of producing rotary motion 15 is such that when not activated, the crankshaft 14 is prevented from rotating.

The torque force resulting from the rotation of the crankshaft 14 is transmitted to an eccentric which is illustrated as a crank lever 16 fixed to the crankshaft 14 within the valve body 11. The free end of the crank lever 16 is pivotally connected, for example by a bolt, to a link member 17. The link member 17 is also pivotally coupled to a valve disc 18 at a point displaced from, i.e. below, the central axis of the valve disc 18. Fixed about the periphery of the valve disc 18 is a valve seal 19 made of a material suitable to mate with the valve seat 13 upon pressurized contact.

Figure 8:
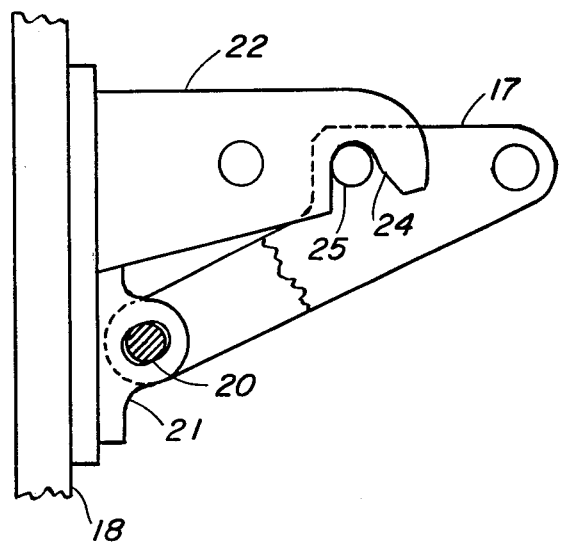
FIG. 8 is an enlarged sectional view of the hook member and link member, with the valve in the closed position, detailing a preferred embodiment of the pivotal connection of the link member to the valve disc.

The link member 17 is pivotally coupled to the valve disc 18 by a cylindrical fastener 20, such as a bolt, placed through a corresponding hole through the link member and an adjacent slot in a lug 21 fixed to the valve disc 18, as illustrated in FIG. 8.

The length of the slot 21 is between one and one-quarter and one and one-half times the diameter of the cylindrical fastener 20, and its width is large enough to allow the cylindrical fastener 20 to move laterally within the slot. The play between the cylindrical fastener 20 and the slot enables the disc to rock before engaging the valve seat 13 so that full peripheral contact of the valve disc 18 with the valve seat 13 is achieved. The lug 21 is positioned such that when the valve disc 18 is in its closed position, as illustrated in FIG. 3, the linear direction of the slot is aligned with, and parallel to, the centerline of the link member, drawn between the cylindrical fastener 20 and the point of pivotal connection of the crank lever with the link member 17.

Figure 9:
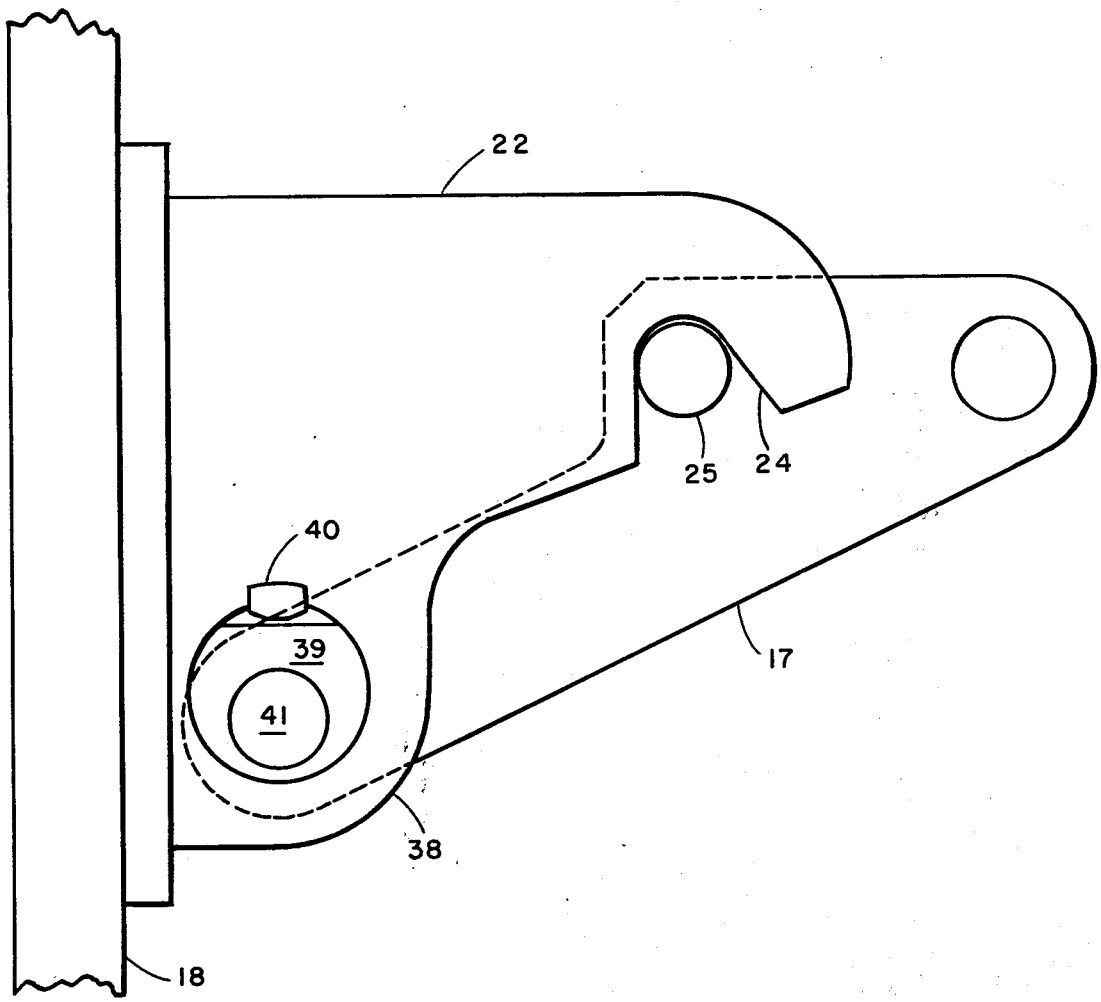
FIG. 9 is an enlarged sectional view of the hook member and the link member, with the valve in the closed position, detailing an alternate embodiment of the pivotal connection of the link member to the valve disc.

An alternate embodiment of a means for pivotally coupling the link member 17 to the valve disc 18 is illustrated in FIG. 9. A lug 38, containing a circular hole, replaces the lug 21 which contains a slot. An eccentric member 39 is rotatably mounted in the circular hole of the lug 38. The eccentric member 39 is in the form of a portion of a circle, with an arc of greater than 180°, bisected by a secant which forms a flat edge on the circle, as illustrated in FIG. 9. The eccentric member 39, in place in the lug 38, does not fill the circular hole in the lug 38. A key 40 is fixed within the circular hole in the lug 39 as illustrated in FIG. 9. The key 40 serves as a stop to limit the rotation of the eccentric member 39, within the lug 38, to a pre-set arc. A cylindrical fastener 41 is fixed to the apex of the arc of the eccentric member 39, opposite to the flat edge of the eccentric member 39, and projecting perpendicular to the face of the eccentric member 39. The link member 17 is pivotally connected to the cylindrical fastener 41. Rotation of the eccentric member 39 within its pre-set arc produces a rocking motion of the valve disc 18 in relation to the link member 17.

Figure 3:
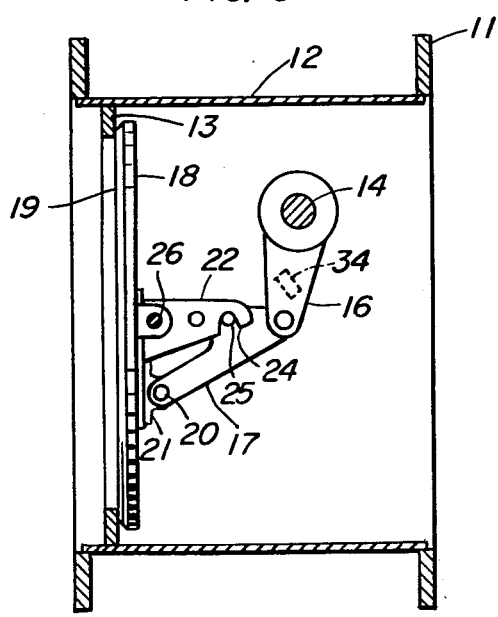
FIG. 3 is a sectional side view of the valve of FIG. 1 in the closed position.

Force is initially applied to the valve disc 18 through a hooked member 22, as illustrated in FIGS. 1, 3, 5 and 8, which is fixed about the center of the valve disc 18. A hook pin 25 is fixed to the link member 17 and positioned so that the hook pin 25 engages the eye 24 of the hooked member 22 when the valve disc 18 is in the closed position, as illustrated in FIG. 8. The hook pin 25 is positioned along the central axis of the valve body 11 when the valve disc 18 is in the closed position, as illustrated in FIG. 3. Force from the crank lever 16 is directed through the link member 17 to the hook pin 25 to the eye 24 and, in turn, the hooked member 22 to the valve disc 18, in that position.

Figure 2:
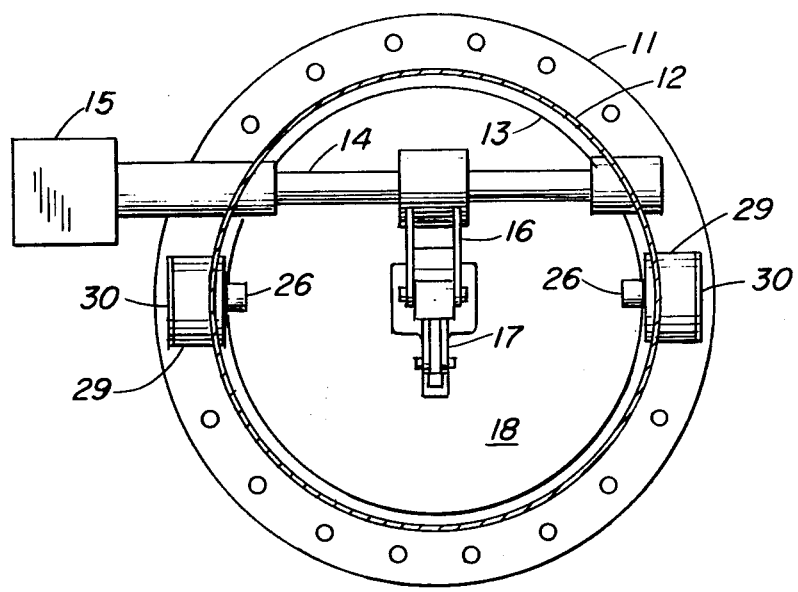
FIG. 2 is a rear sectional view of the valve of FIG. 1 in the closed position.
Figure 7:
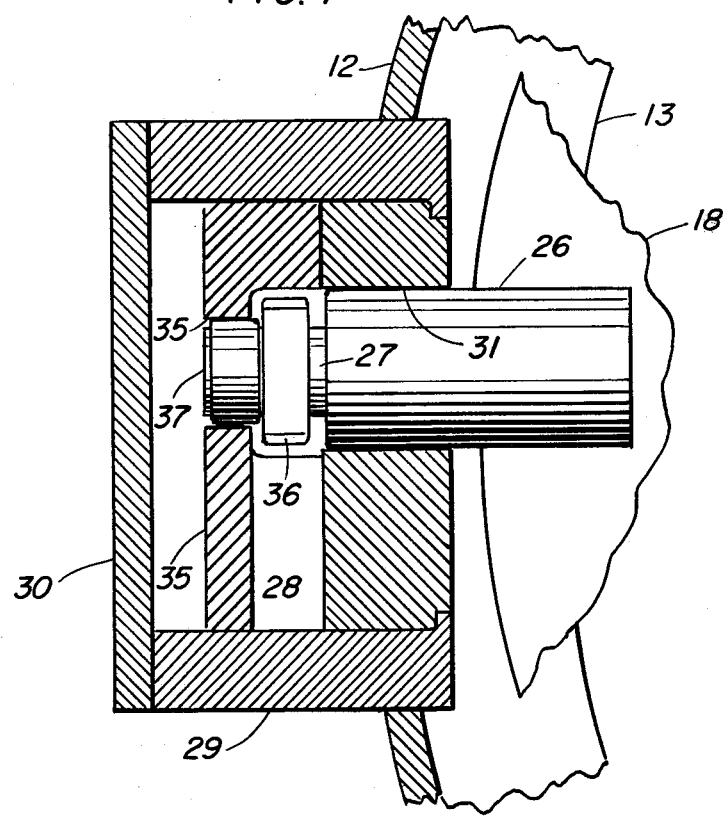
FIG. 7 is a rear sectional view of the left guide block of FIG. 6 with the valve in the closed position.

Two stub shafts 26 are symetrically fixed on a common axis running across the surface of the valve disc 18, as illustrated in FIGS. 1 and 2. Each stub shaft end 27 extends beyond the periphery of the valve disc 18 into a corresponding guide block 28 which is fixed to the valve body wall 12 on opposite sides of the valve body 11, as illustrated in FIGS. 1 and 7.

Figure 4:
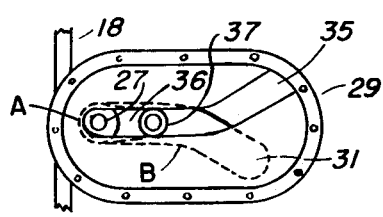
FIG. 4 is an enlarged sectional side view of the left guide block with the valve of FIG. 1 in the closed position.
Figure 6:
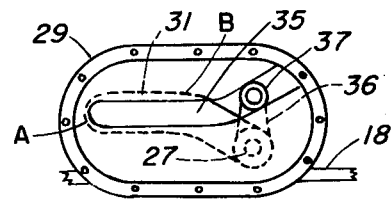
FIG. 6 is an enlarged sectional side view of the left guide block of FIG. 4 with the valve in the open position.

Each of the guide blocks 28 is comprised of a housing 29 into which is fitted, firstly, a guide track 31 and, secondly, superimposed on the guide track 31, a roller way 35. A cover 30 is placed over the guide block 28 to seal it, as illustrated in FIGS. 1 and 7. In each guide block 28, the corresponding stub shaft end 27 extends into the guide track 31, as illustrated in FIG. 7. A roller lever 36 is fixed to the outboard end of each stub shaft end 27, as illustrated in FIGS. 1, 4, 6 and 7, and positioned so as to allow it to move freely within a space between the guide track 31 and roller way 35, as illustrated in FIG. 7. A roller 37 is fixed to the free end of each roller lever 36 and positioned so as to ride in a roller way 35, as illustrated in FIGS. 4, 6 and 7.

Each of the guide tracks 31 contains a linear slot, as illustrated in FIGS. 4 and 6, the slot being directed from its initial end A horizontally to its terminal end B where it changes direction downward at an oblique included angle, as illustrated in FIGS. 4 and 6. The width of each slot in the guide tracks 31 is great enough to accommodate lateral motion of a stub shaft end 27 positioned in the slot, as illustrated in FIG. 7.

Each of the roller ways 35 also contains a linear slot, as illustrated in FIGS. 4 and 6, and, like the guide tracks 31, the slot is directed horizontally to a point where it changes direction. However, unlike slots in the guide tracks 31, the slots in the roller ways 35 change direction upward at an oblique included angle, as illustrated in FIGS. 4 and 6. The width of each slot in the roller way 35 is great enough to accommodate a roller 37, as illustrated in FIG. 7.

The positioning of each roller way 35 as superimposed on a guide track 31, as illustrated in FIG. 4 and FIG. 6, is such that their respective slots form a fork or wishbone pattern.

In FIG. 1, the valve is shown as being in a closed position; the valve disc 18 has its seal 19 fully and positively engaged with seat 13. The valve is opened by activation of the means 15 for producing rotary motion which, as illustrated, rotates the crankshaft 14 a counterclockwise direction, which, in turn, moves the crank lever 16 in a direction away from the valve seat 13. The motion of the crank lever 16 applies directional force to the link member 17 which, in turn, at that instant applies directional force to the hook pin 25, through the hook member 22, to the center point of the valve disc 18 causing seal 19 to move away from the valve seat 13. The direction of the motion of the valve disc 18 away from the valve seat 13 is controlled by the engagement and interaction of the stub shaft ends 27 with the guide blocks 28. As the valve disc 18 is moved away from the valve seat 13, the motion of the valve disc 18 is, initially, positively linearly directed axially as the stub shaft ends 27 move in the guide tracks 31 along the central axis of the valve body 11, these guide tracks being perpendicular to the axis of the stub shafts 26. Initially, each roller lever 36, fixed to the stub shaft end 27, forces a roller 37, linearly directed by the slot in the roller way 35, in the same direction in which the valve disc 18 is moving, thus preventing any pivotation of the valve disc 18. However, when the rollers 37 reach the point A, the slots in the roller ways 35 are angularly redirected. As a result of the longitudinal alignment of each roller 37 with its corresponding roller way 35, the rollers move in the same line of direction at the point C where the roller 37 passes the point at which the slot in the roller way 35 is angularly redirected, the roller 37, directing the roller lever 36, is forced into the upward angle of the roller way 35, forcing the roller lever 36 to commence rotation of the stub shafts 26, about their common axis, as the valve disc 18 is further moved away from the valve seat 13. This causes the valve disc 18 to begin to pivot.

The pivotation of valve disc 18 causes the hook member 22 to disengage the hook pin 25 and this disengagement shifts the applied directional force from the center of the valve disc 18 to the point, below center of the valve disc 18, where the lug 21 is positioned, as illustrated in FIGS. 1, 3, 5 and 8. The cylindrical fastener 20 is forced to the point within the slot in the lug 21 furthest from the valve disc 18. The shift in the point of force applied to the valve disc 18 enhances the pivotation of the valve disc 18 about the axis of the stub shafts 26.

As the stub shaft 26 passes the terminal end B of the slot in the guide track 31, the stub shaft end 27 is forced into the downward angulation of the slot in the guide track 31, concurrent with pivotation of the valve disc 18. At a point where the valve disc 18 has pivoted 90° from its closed position, as shown in FIG. 3, to its fully open position, as shown in FIG. 5, the link members 17 encounter a stop 34, fixed to the crank lever 16, and all motion ceases.

Figure 5:
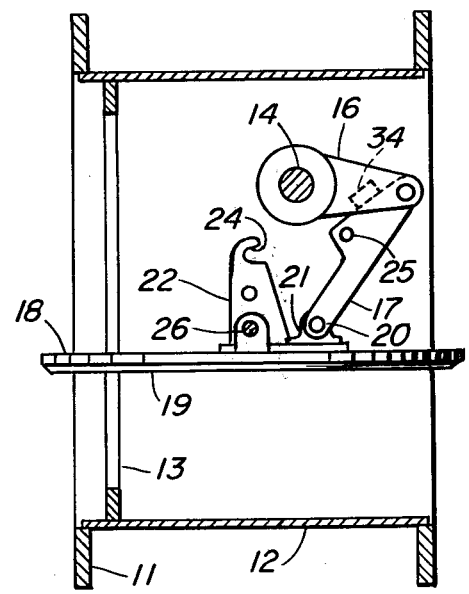
FIG. 5 is a sectional side view of the valve of FIG. 1 in the open position.

In the open position, FIG. 5, the valve disc 18 is held rigidly in place. This rigidity is caused by halting the means of producing rotary motion 15 which, in turn, prevents rotation of the crankshaft 14 and thus rigidly positions the crank lever as illustrated in FIG. 5. Due to the position of the stop 34, the link member 17 is prevented from pivoting toward the valve seat 13. At this position of the link member 17, the cylindrical fastener 40 remains positioned at the end of the slot in the lug 21 furthest from the valve disc 18, thus the valve disc is prevented from pivoting clockwise about the axis of the stub shafts 26, as illustrated in FIG. 5. FIG. 6 illustrates the position of the stub shaft end 27 in position in the corresponding guide track 31 when the valve disc 18 is in the open position. The valve disc 18 is prevented from pivoting about the stub shaft ends 27 by the position of the walls of the guide track 31 and the relation of the stub shaft end 27 to those walls as illustrated in FIG. 6. The valve disc 18 is prevented from moving further away from the valve seat 13 by the stub shaft ends 27 being positioned against the angled end of the guide tracks 31 as illustrated in FIG. 6.

Closure of the valve disc follows, generally, a reverse of the sequence of the steps of the opening procedure, commencing from the open position, as shown in FIGS. 5 and 6, and following in order until the valve disc is in position against the seat, as shown in FIG. 3. The direction of rotary force applied by the means of producing rotary motion 15 is reversed, i.e., now in a clockwise direction, from that of the opening cycle, thus urging the crankshaft 14 to rotate in a direction opposite to that of the opening cycle. The crank lever 16 commences movement in a clockwise direction. The link member 17 is forced downwardly from the position illustrated in FIG. 5 which in turn shifts the position of the cylindrical fastener 20 to a position of the slot in the lug 21 closest to the valve disc 18. This causes the valve disc 18, and thus the stub shaft ends 26, to move toward the valve seat 13. Concurrently, each roller lever 36 is oscillated as its roller 37 is drawn along the corresponding roller way 35 in a direction opposite to that of the opening cycle, causing the corresponding stub shaft 26 to be rotated, resulting in the pivotation of the valve disc 18 in a clockwise direction, opposite to that of the opening cycle. At the point where the valve disc 18 has been pivoted a full 90°, the hooked member 22, which is fixed in relation to the valve disc 18, re-engages the hook pin 25 as the link member 17 is pivoted about the cylindrical fastener 20 engaged with the lug 21. This causes the cylindrical fastener 20 to shift within the slot in the lug 21 resulting in the force directed to the valve disc 18 to be transmitted through the hooked member 22 to the center of the valve disc 18 and removing the point of force on the valve disc 18 from the pivotal coupling of the link members 17 to the valve disc 18.

The simultaneous engagement of the hooked member 22 with the hook pin 25 and the transfer of points of force causes the lug 21 to be moved, along its slot, in relation to the cylindrical fastener 20, resulting in a rocking of the valve disc 18, just prior to its coming into contact with the valve seat 13, thus disposing the valve disc 18 parallel to the valve seat 13 such that full peripheral contact of the valve seal 20 with the valve seat 13 is achieved as the valve disc 18 is pressed against the valve seat 13. Thus the closing cycle is completed.

According to the provisions of the patent statutes, the principle, construction and mode of operation of the present invention have been explained along with illustrations and a description of what is considered to be the best mode for carrying out that invention. However, it is to be understood that, within the scope of the appended claims, the present invention may be practiced otherwise than as specifically illustrated and described.

What is claimed is:

1. A pivotal disc shut-off valve comprising:
   (a) a valve body;
   (b) a valve seat integrally mounted within said valve body;
   (c) a crank shaft positioned perpendicular to, but offset from, the central axis of said valve body;
   (d) means for rotating said crank shaft about its axis;
   (e) a crank lever fixed at one end to said crank shaft;
   (f) a link member pivotally mounted on the other end of said crank lever;
   (g) a valve disc pivotally disposed within said valve body and pivotally connected to the other end of each said link member, such that upon rotation of said crank shaft, said crank lever exerts linear force on said link member which, in turn, exerts linear force upon said disc;
   (h) a plurality of pivotation extensions fixed to a common axis on said valve disc and extending beyond the periphery of said valve disc;
   (i) a plurality of guide means positioned such that each of said pivotation extensions engages one or more of said guide means, said guide means being positioned so as to allow lateral travel of said pivotation extensions in a direction parallel to the central axis of said valve body;
   (j) means for directing said pivotation extensions in said guide means, by lever action, initially in a linear direction parallel to the central axis of said valve body until a given position is reached, then redirecting the motion of said pivotation extensions into a rotation about the said common axis of said pivotation extensions such that said linear force exerted by said crank levers through said link members onto the said valve disc, by means of rotation of said crank shaft, causes said valve disc, with said pivotation extensions fixed thereto, directed by said directing means, to move, firstly, in a lateral direction along the central axis of said valve body, secondly, to pivot about said common axis of said pivotation extensions, and, thirdly, to come to rest at a position at a right angle to the original position of said valve disc, and wherein said sequence of motion can be reversed by reversing the direction of rotation of said crank shaft.

(k) a hook member fixed at one to the center of, and positioned perpendicular to, said valve disc;

(l) a hook fixed to the free end of said hook member and positioned adjacent to said link member when said valve disc is in a plane parallel to said valve seat;

(m) a hook pin fixed to said link member and engaged with said hook when said valve disc is in the closed position against said valve seat, remaining engaged during said lateral motion of said valve disc, becoming disengaged as said valve disc pivots about said common axis of said pivotation extensions such that said linear force exerted onto said valve disc is transmitted to said valve disc through said hook pin, said hook and said hook member during said lateral motion of said valve disc.

2. A pivotal disc shut-off valve as recited in claim 1 in which said means for directing said pivot shaft comprises:

(a) a plurality of guide levers, one each of which is fixed to each end of said pivotation extensions and positioned parallel to said central axis of said valve body when said valve disc is parallel to the plane of said valve seat;

(b) a plurality of roller ways, each containing a linearly angled slot, each slot forming the two legs of an angle, one said leg of each said slot positioned linearly parallel to said central axis of said valve body, the other said leg of each said slot directed, at an oblique included angle, toward the position of said crankshaft;

(c) a plurality of rollers, one each of which is fixed to each of the free ends of each said guide levers and positioned within said slots to follow the direction of said slots through said oblique included angle.

3. A pivotal disc shut-off valve as recited in claim 1 in which said guide means comprise a plurality of slotted guide tracks positioned about said pivotation extensions, containing slots directed linearly parallel to said central axis of said valve body to a point where said linear direction of said slots is redirected, at an oblique included angle, away from said crankshaft so that said pivotation extensions can laterally traverse said slots in two directions, tracking said included angle.

4. A pivotal disc shut-off valve as recited in claim 1 wherein said pivotal connection between said link member and said valve disc further comprises:

(a) a slotted lug fixed to said valve disc, offset from the center of said valve disc in a direction opposite to the position of said crankshaft in relation to said center of said valve disc when said valve disc is in the closed position, the linear direction of said slot in said lug running toward the point at which said link member is pivotally mounted to said crank lever when said valve disc is in its closed position;

(b) a cylindrical fastener, fixed to said second end of each said link member and passing through said slot in said lug, sized to allow said cylindrical fastener to oscillate within said slot in said lug.

5. A pivotal disc shut-off valve as recited in claim 1 wherein said pivotal connection between said link member and said valve disc further comprises:

(a) a lug fixed to said valve disc, offset from the center of said valve disc in a direction opposite to the position of said crankshaft in relation to said center of said valve disc when said valve disc is in the closed position, containing a circular aperture the axis of which is parallel to the plane of said valve disc;

(b) a semicircular eccentric member rotatably mounted within said circular aperture of said lug, said eccentric member being shaped in the form of an arc of more than 180°, bisected by a secant line which forms a flat edge on said eccentric member such that said eccentric member, when mounted within said circular aperture of said lug, does not fill said circular aperture of said lug;

(c) a key fixed within said circular aperture of said lug, sized to allow said eccentric member to concurrently be mounted within said circular aperture of said lug and to allow said eccentric member to rotatably traverse a given arc of less than 90° when mounted within said circular aperture of said lug;

(d) a cylindrical fastener, fixed to said eccentric member adjacent to the apex of said arc of said eccentric member opposite to said flat edge of said eccentric member, perpendicularly projecting from the plane of said circular slug, pivotally connecting said link member to said eccentric member.

6. A pivotal disc shut-off valve as recited in claim 1 wherein said pivotal connection between said link member and said valve disc further comprises:

(a) a slotted lug fixed to said valve disc, offset from the center of said valve disc in a direction opposite to the position of said crankshaft in relation to said center of said valve disc when said valve disc is in the closed position, the linear direction of said slot in said lug running toward the point at which said link member is pivotally mounted to said crank lever when said valve disc is in its colosed position;

(b) a cylindrical fastener, fixed to said second end of each said link member and passing through said slot in said lug, sized to allow said cylindrical fastener to oscillate within said slot in said lug.

7. A pivotal disc shut-off valve as recited in claim 1 wherein said pivotal connection between said link member and said valve disc further comprises:

(a) a lug fixed to said valve disc, offset from the center of said valve disc in a direction opposite to the position of said crankshaft in relation to said center of said valve disc when said valve disc is in the closed position, containing a circular aperture the axis of which is parallel to the plane of said valve disc;

(b) a semicircular eccentric member rotatably mounted within said circular aperture of said lug, said eccentric member being shaped in the form of an arc of more than 180°, bisected by a secant line which forms a flat edge on said eccentric member such that said eccentric member, when mounted within said circular aperture of said lug, does not fill said circular aperture of said lug;

(c) a rectangular key fixed within said circular aperture of said lug, sized to allow said eccentric member to concurrently be mounted within said circular aperture of said lug and to allow said eccentric member to rotatably traverse a given arc of less than 90° when mounted within said circular aperture of said lug;

(d) a cylindrical fastener, fixed to said eccentric member adjacent to the apex of said arc of said eccentric member opposite to said flat edge of said eccentric member, perpendicularly projecting from the plane of said circular slug, pivotally connecting said link member to said eccentric member.

8. A pivotal disc shut-off valve comprising:
(a) a valve body;
(b) a valve seat integrally mounted within said valve body;
(c) a crankshaft positioned within said valve body, perpendicular to, but offset from, the central axis of said valve body;
(d) means for rotating said crankshaft about its axis;
(e) a crank lever fixed at one end to said crankshaft;
(f) a link member one end of which is pivotally mounted on the other end of said crank lever;
(g) a valve disc pivotally disposed within said valve body;
(h) a valve seal mounted on the peripheral face of said valve disc positioned to engage said valve seat when said valve disc is in the closed position against said valve seat;
(i) a slotted lug fixed to said valve disc, offset from the center of said valve disc in a direction opposite to the position of said crankshaft in relation to said center of said valve disc when said valve disc is in the closed position, the linear direction of said slot in said lug running toward the point at which said link member is pivotally mounted to said crank lever when said valve disc is in its closed position;
(j) a cylindrical fastener fixed to the other end of said link member and passing through said slot in said lug, forming a pivotal coupling between said link member and said valve disc, sized to allow said cylindrical fastener to oscillate within said slot in said lug;
(k) a hook member fixed at one end to the center of, and positioned perpendicular to, said valve disc;
(l) a hook fixed to the free end of said hook member and positioned adjacent to said hook member when said valve disc is in a plane parallel to said valve seat;
(m) a hook pin fixed to said link member and engaged with said hook when said valve is in a plane parallel to said valve seat;
(n) a plurality of stub shaft fixed to the surface of said valve disc along a common axis running across the center of said valve disc, extending beyond the periphery of said valve disc;
(o) a plurality of sealed frames mounted through the opposite walls of said valve body;
(p) a plurality of slotted guide tracks mounted within said sealed frames, positioned about the ends of said stub shafts, containing slots directed linearly parallel to said central axis of said valve body to a point where said linear direction of said slots in redirected, at an oblique included angle, away from said crankshaft so that said ends of stub shafts can laterally traverse said slots in two directions, tracking said included angle;
(q) a plurality of guide levers, one each of which is fixed to each said end of said stub shafts and positioned parallel to said central axis of said valve body when said valve disc is parallel to the plane of said valve seat;
(r) a plurality of roller ways, mounted within said sealed frames outbound from said slotted guide tracks, each containing a linearly angled slot, each said slot forming the two legs of an angle, one said leg of each slot positioned linearly parallel to said central axis of said valve body, the other said leg of said slot directed, at an oblique included angle, toward the position of said crankshaft;
(s) a plurality of rollers, one each of which is fixed to each of the other ends of said guide levers and positioned within said slots to follow the direction of said slots through said oblique included angle.

9. A pivotal disc shut-off valve comprising:
(a) a valve body;
(b) a valve seat integrally mounted within said valve body;
(c) a crankshaft positioned within said valve body, perpendicular to, but offset from, the central axis of said valve body;
(d) means for rotating said crankshaft about its axis;
(e) a crank lever fixed at one end to said crankshaft;
(f) a link member one end of which is pivotally mounted on the other end of said crank lever;
(g) a valve disc pivotally disposed within said valve body;
(h) a valve seal mounted on the peripheral face of said valve disc positioned to engage said valve seat when said valve disc is in the closed position against said valve seat;
(i) a lug fixed to said valve disc, offset from the center of said valve disc in a direction opposite to the position of said crankshaft in relation to said center of said valve disc when said valve disc is in the closed position, containing a circular aperture the axis of which is parallel to the plane of said valve disc;
(j) a semicircular eccentric member rotatably mounted within said circular aperture of said lug, said eccentric member being shaped in the form of an arc of more than 180°, bisected by a secant line which forms a flat edge on said eccentric member such that said eccentric member, when mounted within said circular aperture of said lug, does not fill said circular aperture of said lug;
(k) a rectangular key fixed within said circular aperture of said lug, sized to allow said eccentric member to concurrently be mounted within said circular aperture of said lug and to allow said eccentric member to rotatably traverse a given arc of less than 90° when mounted within said circular aperture of said lug;
(l) a cylindrical fastener, fixed to said eccentric member adjacent to the apex of said arc of said eccentric member opposite to said flat edge of said eccentric member, perpendicularly projecting from the plane of said eccentric member, pivotally connecting said link member to said eccentric member;
(m) a hook member fixed at one end to the center of, and positioned perpendicular to, said valve disc;
(n) a hook fixed to the free end of said hook member and positioned adjacent to said link member when said valve disc is in a plane parallel to said valve seat;
(o) a hook pin fixed to said link member and engaged with said hook when said valve is in a plane parallel to said valve seat;
(p) a plurality of stub shaft fixed to the surface of said valve disc along a common axis running across the center of said valve disc, extending beyond the periphery of said valve disc;
(q) a plurality of sealed frames mounted through the opposite walls of said valve body;
(r) a plurality of slotted guide tracks mounted within said sealed frames, positioned about the ends of said stub shafts, containing slots directed linearly parallel to said central axis of said valve body to a point where said linear direction of said slots id redirected, at an oblique included angle, away from said crankshaft so that said ends of said stub shafts can laterally traverse said slots in two direction, tracking said included angle;
(s) a plurality of guide levers, one each of which is fixed to each said end of said stub shafts and positioned parallel to said central axis of said valve body when said valve disc is parallel to the plane of said valve seat;
(t) a plurality of roller ways, mounted within said sealed frames outbound from said slotted guide tracks, each containing a linearly angled slot, each said slot forming the two legs of an angle, one said leg of each slot positioned linearly parallel to said central axis of said valve body, the other said leg of each said slot directed, at an oblique included angle, toward the position of said crankshaft;
(u) a plurality of rollers, one each of which is fixed to each of the other ends of said guide levers and positioned within said slots to follow the direction of said slots through said oblique included angle.

* * * * *